United States Patent
Hofmann et al.

(10) Patent No.: US 8,658,123 B2
(45) Date of Patent: Feb. 25, 2014

(54) METHOD FOR PRODUCING A COARSE-GRAINED AMMONIUM SULFATE PRODUCT VIA CRYSTALLIZATION AND INSTALLATION FOR OPERATING THE METHOD

(71) Applicant: GEA Messo GmbH, Duisburg (DE)

(72) Inventors: Günter Hofmann, Duisburg (DE); Holger Leptien, Duisburg (DE); Johannes Widua, Nettetal (DE)

(73) Assignee: GEA Messo GmbH, Duisburg (DE)

( * ) Notice: Subject to any disclaimer, the term of this patent is extended or adjusted under 35 U.S.C. 154(b) by 0 days.

(21) Appl. No.: 13/780,297

(22) Filed: Feb. 28, 2013

(65) Prior Publication Data
US 2013/0230446 A1    Sep. 5, 2013

(30) Foreign Application Priority Data
Mar. 1, 2012 (DE) .......... 10 2012 101 702

(51) Int. Cl.
*B01D 9/00* (2006.01)
*C01C 1/24* (2006.01)

(52) U.S. Cl.
USPC ........ 423/545; 23/295 R; 23/302 A; 422/187; 422/608; 422/609; 422/235; 422/245.1

(58) Field of Classification Search
USPC ............ 423/545; 23/295 R, 302 A; 422/187, 422/608, 609, 235, 245.1
See application file for complete search history.

(56) References Cited

U.S. PATENT DOCUMENTS

| | | | |
|---|---|---|---|
| 7,056,356 B2 * | 6/2006 | Allen et al. | 23/295 R |
| 7,942,939 B2 | 5/2011 | Hofmann et al. | |
| 2003/0180202 A1 * | 9/2003 | Ellen et al. | 422/245.1 |
| 2007/0231238 A1 | 10/2007 | Hinsen et al. | |
| 2011/0061205 A1 | 3/2011 | Scholz et al. | |

FOREIGN PATENT DOCUMENTS

| | | |
|---|---|---|
| DE | 102008007154 A1 | 8/2009 |
| DE | 102008029050 A1 | 12/2009 |
| EP | 0632738 B1 | 11/1995 |
| JP | 2005194153 A | 7/2005 |
| WO | 00/56416 A1 | 9/2000 |

* cited by examiner

*Primary Examiner* — Timothy Vanoy
(74) *Attorney, Agent, or Firm* — Gardner, Linn, Burkhart & Flory, LLP

(57) ABSTRACT

Method for the production of a coarse-grained ammonium sulphate product by crystallization and installation for carrying out the method from an ammonium sulphate solution in a DTB type crystallizer having an internal suspension circuit and a clarifying zone, from which a clarified partial flow of solution is constantly drawn off into an external circuit, is heated in a heat exchanger to dissolve the solids contained therein and is guided back as a clear solution into the lower region of the crystallizer. A fine crystal suspension flow is drawn off from the clarifying zone as a further partial flow and guided back into the internal circuit of the crystallization stage without any previous dissolution of the solid proportion contained therein.

20 Claims, 1 Drawing Sheet

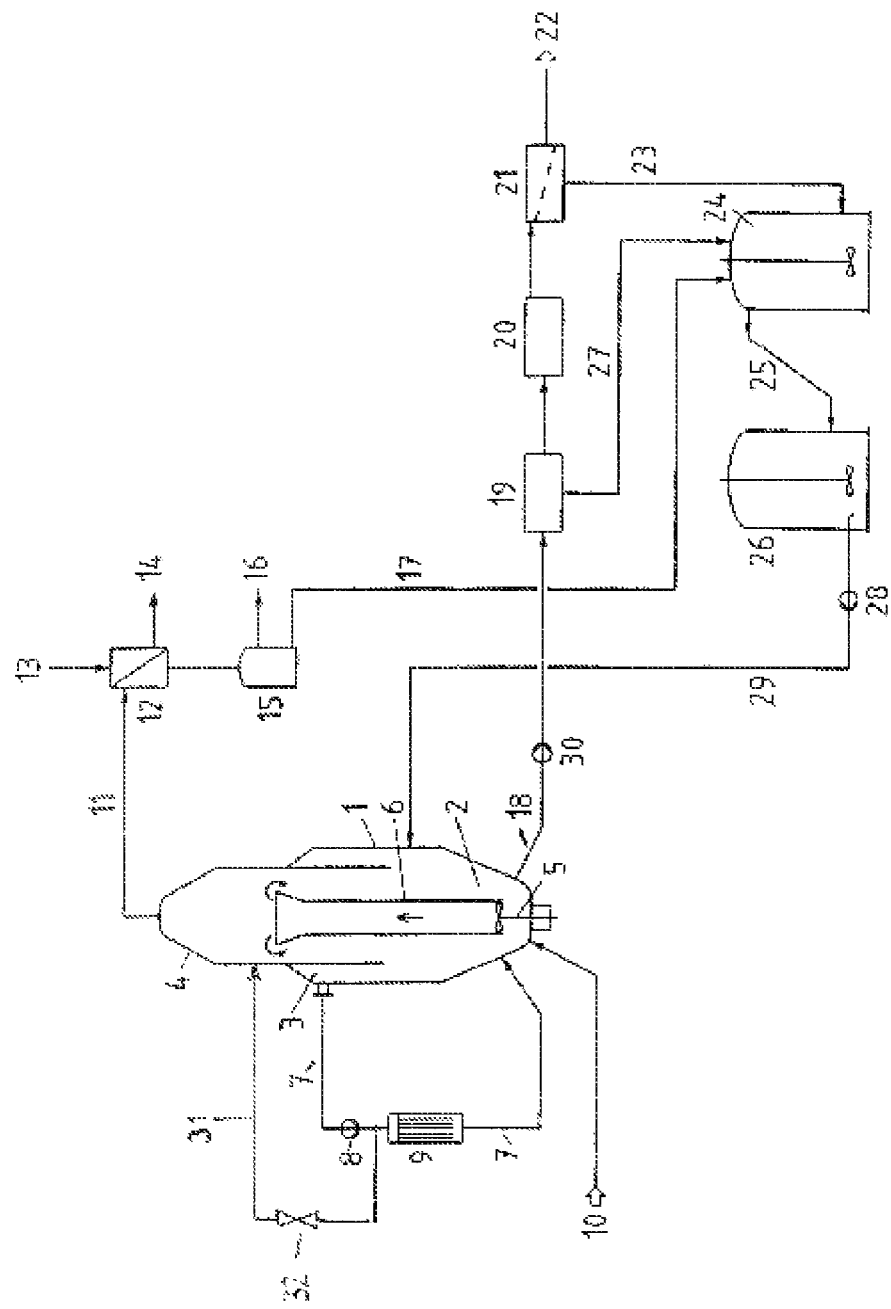

METHOD FOR PRODUCING A COARSE-GRAINED AMMONIUM SULFATE PRODUCT VIA CRYSTALLIZATION AND INSTALLATION FOR OPERATING THE METHOD

BACKGROUND OF THE INVENTION

The invention relates to a method for the continuous production of a coarse-grained ammonium sulphate product by crystallization of an ammonium sulphate solution in a crystallization stage, which is operated in accordance with the draft tube baffled (DTB) principle and to an installation for carrying out this method.

Ammonium sulphate (($NH_4$)$_2SO_4$) is a product which is produced on a large scale and is used mainly as fertilizer in agriculture to provide nitrogen and sulphur. In industrial terms, ammonium sulphate is produced as a by-product in some chemical processes, in particular in the production of caprolactam. In order to satisfy the requirements as a fertilizer, the ammonium sulphate should be available as a coarse-grained product (grain size diameter (RRSB) in the range of 2 to 3 mm). This is important in order to ensure effective scattering power and, when being mixed with other fertilizing substances, to suppress the tendency towards demixing which would be increased by fine-grain product in a grain mixture.

In order to produce the coarse-grained crystallizate from an ammonium sulphate solution, crystallizers of the DTB type are very frequently used. This gives rise to the problem that the average grain size, produced in the crystallizer, of the crystallizate which is drawn off in a suspension is subjected to periodic fluctuations, i.e., phases with a high coarse grain proportion alternate with phases, in which predominantly fine-grained crystallizate (e.g., grain size of less than 1.5 mm) is produced. The reasons for this are set out hereinafter.

During the course of the operating period, the size of the formed crystals initially increases constantly, since by reason of the fine-grain discharge by the outer solution circuit of the crystallizer only the crystals which become ever larger are available for breaking down the oversaturation. The rate of oversaturation break-down on the crystals is, in a first approximation, proportional to the product of diffusion rate and available crystal surface area. Since the specific surface area of the crystal stock in the crystallizer becomes smaller as the grain becomes ever larger, the oversaturation must become continuously larger in order to achieve the production output specified by evaporation. If the oversaturation then exceeds the metastable range, spontaneous nucleation occurs suddenly with a myriad of very fine crystals. Although they are dissolved for the most part in the external circuit, a proportion of the fine crystals still remains in the internal circulation circuit and grows to the grain size which can no longer be discharged via the clarifying zone, but initially is still considerably smaller than the grain size intended for the product. Over time, these crystals then grow to the desired grain size. After a further increase in the grain size, spontaneous nucleation then occurs again, i.e., the cycle starts anew.

EP 0632738 B1, which is a generic type, discloses a continuous crystallization method, in which a coarse-grained ammonium sulphate crystallizate can be produced from an oversaturated, aqueous ammonium sulphate solution in a DTB crystallizer. In this method, a suspension of oversaturated ammonium sulphate solution and already formed crystallizate is constantly circulated within the DTB crystallizer in an internal circuit. By means of evaporation of the solvent (water), new oversaturation is continuously produced which is then broken down as a consequence of the crystallization which occurs. The vapour produced during evaporation is drawn off at the head of the DTB crystallizer. From a part which is separated from the internal circuit of the suspension by means of flow guide walls in the upper region of the crystallization chamber of the DTB crystallizer and in which, in contrast to the base region of the crystallizer, a clarified solution is present having a solid proportion consisting substantially of crystallization nuclei and fine crystals, a partial flow of clarified solution is drawn off and, after dissolution of the solid proportion contained therein, is then guided back into the base region of the crystallization chamber. In order to dissolve the solid proportion, a heat exchanger is connected into the external circuit and elevates the temperature of the clarified solution and thus the power of the solvent to dissolve ammonium sulphate. Moreover, the supply line, through which new concentrated ammonium sulphate solution can be fed into the crystallizer, also issues into the external circuit upstream of the heat exchanger. A suspension flow with the proportion of solids contained therein at the desired grain size of the product crystallizate is continuously drawn off from the base region. The product crystallizate is separated from the mother liquor or solution in a thickener and by subsequent centrifugation and the mother solution is then guided back into the DTB crystallizer.

In order to increase production of a sufficiently coarse-grained crystallizate and to improve production with regard to cyclical fluctuations in grain size, in this method a crystallizate suspension of ammonium sulphate is fed at a constant inflow rate from an external source into the crystallizer, in addition to the supply of saturated ammonium sulphate solution. EP 0632738 B1 does not contain any references to the way in which the suspension is produced, i.e., whether it has been produced for instance by comminution of product crystallizate or in a separate crystallizer. It is merely specified that this suspension must satisfy specific conditions: the temperature of the suspension fed in must not exceed the operating temperature in the crystallizer. Moreover, the suspension must contain 6-24 vol. % crystallizate, wherein at least 35% of the crystals are larger than 1.2 mm, and the feed of the suspension is to be dimensioned such that the weight of the crystals in the suspension fed in is in the range of 4-25% of the weight of the crystals in the suspension with the product crystallizate, said suspension being drawn off from the base region of the crystallizer.

A controlled feed of crystal suspension into a crystallizer to influence the grain size is also defined as seeding.

WO 00/56416 discloses a method for controlling the grain size in continuous mass crystallization which is also provided for producing coarse-grained ammonium sulphate crystallizate in a DTB crystallizer and in which, in a similar manner to the method in accordance with EP 0632738 B1, seeding is effected with an externally supplied crystal suspension. The seeding product is a crystallizate which is produced in its parameters independently of the current crystallization process and which has an average grain diameter of 0.1-1.0 mm. In this method, the temperature of the seeding product during the addition also must not be higher than the operating temperature in the crystallizer, but must be up to 40° C., preferably 10-30° C., less. All other feeds and recirculations are free of solids. In particular, this means that the feedstock for producing the ammonium sulphate product crystallizate is supplied as a preheated, solid-free ammonium sulphate feed solution, and that the external circuit consisting of the drawn-off solution with a fine solid proportion leads from the crystallizer initially to a heat exchanger which, by elevating the temperature of the solution, causes the solid proportion to re-dissolve, before the solid-free solution is then guided back into the crystallizer. The heat energy for heating the heat exchanger is provided by means of the vapour which is drawn off from the crystallizer and is brought to a higher temperature level initially by means of vapour compression. From the base region of the crystallizer, a suspension with a solid proportion at the desired grain size is drawn off in a continuous manner and is separated by centrifugation into product crystallizate and mother solution, wherein the mother solution is conveyed into an intermediate vessel from where it is fed back into the circulating line of the external circuit of the crystallizer. The seeding product is preferably added in a quantity, the solid proportion of which amounts to 5-30 wt. % of the solid discharged from the crystallizer in each case. The solid proportion of the seeding product can be produced e.g., by mechanical comminution of a portion of the product crystallizate and/or by a separate crystallization stage.

JP2005-194153 A discloses an installation, which is designed as a DTB crystallizer, for the production of ammonium sulphate crystallizate, in which there is provided an external circuit for clarified solution which is connected to a clarifying zone of the crystallizer and into which optionally there is incorporated a heat exchanger or a supply line for solvents (e.g., water or undersaturated ammonium sulphate solution) for the purpose of dissolving the contained solid proportion. Moreover, the clarifying zone is connected directly or indirectly via the external circuit to a further discharge line, by means of which a suspension which contains only fine crystallizate as the solid can be discharged completely from the process, in order to obtain, e.g., fine-grained ammonium sulphate product. Furthermore, connected to the uppermost part of the clarifying zone is also a third discharge line, by means of which any excess crystallization nuclei and superfine crystallizate can be drawn off and guided into a collecting vessel where required. In order to dissolve the solids, solvent is added to the collecting vessel from where the solution obtained is guided into a neutralisation vessel, in which it is added to sulphuric acid and ammonia and is heated by the neutralization reaction associated therewith. The heated, solid-free solution is then fed into the crystallizer.

In order to avoid the considerable grain size fluctuations in the ammonium sulphate crystallization, DE 102008007154 A1 provides a two-stage crystallization method with DTB crystallizers, in the first stage of which merely a fine crystal suspension is produced which is used for feeding the second stage, in which the coarse crystallizate is produced. In this case, a sufficient quantity of fine crystals to achieve the desired crystal growth is always provided for the second crystallization stage.

In order to avoid periodic fine grain formation in a DTB crystallizer, DE 102008029050 A1 proposes a seeding method, in which a fine crystal suspension which is produced preferably by means of flash-crystallization is fed continuously into the internal suspension circuit of the crystallizer, wherein the quantity of seeding suspension fed in is regulated by observing the fine crystallizate proportion in the internal suspension circuit.

SUMMARY OF THE INVENTION

The present invention improves on the generic method such that a coarse-grained ammonium sulphate crystallizate can be produced with the smallest possible outlay on the installation and method while keeping production output as constant as possible and maintaining a high yield without relatively strong cyclical fluctuations. An installation for carrying out the method is also provided.

An embodiment of the invention relates to a method for the continuous production of a coarse-grained ammonium sulphate product (grain size diameter in the range of 2.0-3.0 mm, in particular 2.3-2.7 mm) by crystallization of an ammonium sulphate solution in a crystallization stage which is operated in accordance with a DTB principle and in which, during evaporation of water, a suspension of mother solution and ammonium sulphate crystals is constantly circulated in an internal circuit and a clarified partial flow of solution is constantly drawn off from a clarifying zone in the upper region of the crystallization stage into an external circuit and is heated so as dissolve the solids contained therein and is then guided back as a clear solution into the lower region of the crystallization stage; a vapour is continuously drawn off from the head of the crystallization stage, and a new suspension is also supplied from outside and a suspension flow having the coarse-grained ammonium sulphate product is drawn off from the lower region of the crystallization stage.

The stated object is achieved by virtue of the fact that as a further partial flow a fine crystal suspension flow is drawn off from the clarifying zone and without any previous dissolution of the solid proportion contained therein is guided back into the internal circuit of the crystallization stage. Surprisingly, it has actually been shown that the solution which can be drawn off from the clarifying zone of the crystallization contains a sufficient amount of fine crystals in order to ensure, as seeding material in the internal suspension circuit, the desired growth of coarse crystallizate.

Although it may be possible to counteract the periodic fluctuations by the periodic supply of this fine crystal suspension as the seeding material, the fine crystal suspension may be recirculated in a continuous manner, in order to ensure the production of coarse crystallizate having a substantially constant grain size spectrum.

The fine crystal suspension flow may be recirculated with a constant flow volume—which is dependent upon the production output of the crystallization stage—per unit of time, so that an almost completely constant crystallization operation is achieved. The quantity of fine crystal suspension to be recirculated per unit of time will be all the greater, the higher the production output of the crystallization state, i.e., the greater the quantity of suspension which is drawn off from the lower region of the crystallization stage per unit of time and has the product crystallizate contained therein.

It is possible to draw off the fine crystal suspension flow from the clarifying zone completely independently of the partial flow of the clarified solution for the external suspension circuit. However, in terms of minimizing installation outlay, it can be expedient to branch off the fine crystal suspension flow from the partial flow of clarified solution of the external circuit prior to heating thereof. As a specific example, the circulating pump of the external circuit can be used and, therefore, a separate pump for conveying the fine crystal suspension can be omitted. This may be used for retrofitting of an already existing crystallization installation.

The flow volume of the fine crystal suspension flow may be adjusted such that the solid proportion contained therein corresponds per unit of time to a quantity in the range of 0.2-3.0% of the quantity of product crystallizate in the suspension flow drawn off from the lower region of the crystallization stage.

In one embodiment, the solids quantity in the recirculated nuclei suspension flow is in the range of 0.8-1.5%, in particular 1% of the product crystallizate quantity.

The fine crystal suspension may be fed back into the internal suspension circuit at a point where the oversaturation of the solution is as large as possible and, therefore, the conditions for rapid crystal growth are particularly favourable. This is the case in particular in the close range of the liquid level of the crystallization stage. Therefore, the nuclei suspension can be introduced into the internal suspension circuit above or just below the liquid level.

These and other objects, advantages and features of this invention will become apparent upon review of the following specification in conjunction with the drawings.

BRIEF DESCRIPTION OF THE DRAWINGS

The invention will be explained in more detail hereinafter with reference to the single FIGURE which shows a schematically illustrated installation for carrying out the method.

DESCRIPTION OF THE PREFERRED EMBODIMENT

Referring now to the drawing and the illustrative embodiments depicted therein, the core of the illustrated installation is a draft tube baffled (DTB) crystallizer 1, whose head is designated by the reference numeral 4 and whose base region is designated by the reference numeral 2. In the interior of the crystallizer 1, a flow guide pipe 6 is disposed coaxially with respect to the substantially cylindrical shell of the crystallizer housing. When the installation is in operation, the liquid level, not illustrated, is in the region of the upper end of the flow guide pipe 6, at whose lower end there is disposed a circulating pump 5 for an internal suspension circuit. The drive of the circulating pump 5 is flanged on the outside to the base of the crystallizer 1. Provided in an upper region of the crystallizer 1 is a flow guide wall which terminates below the liquid level and forms an annular chamber open at the bottom and which in terms of a clarifying region 3 is decoupled as a flow-calmed chamber from the internal suspension circuit. Of course, this annular clarifying chamber can also be divided into several partial chambers by means of radial partition walls. A circuit line 7 of an external solution circuit leads out of the clarifying region 3 and is provided with a circulating pump 8 and leads back into the base region 2 of the crystallizer 1 in the proximity of the lower end of the flow guide pipe 6. In the flow direction downstream of the circulating pump 8, an indirect heat exchanger 9 for dissolving the solids contained in the clear solution is connected into the circuit line 7. The external supply of ammonium sulphate solution to the crystallizer 1 is designated by the reference numeral 10 and leads directly into the base region 2; however, the solution supply line could also issue, e.g., into the line 7 of the external solution circuit.

Connected to the head 4 of the crystallizer 1 is a vapour discharge line 11 which leads to an indirectly cooled condenser 12. The coolant (e.g., water) which is used for cooling the condenser 12 can be supplied to the condenser 12 by means of a coolant supply line 13 and can then be discharged in a heated state via a coolant discharge line 14. The vapour drawn off from the crystallizer 1 can be guided as a condensate from the condenser 12 through a condensate discharge line into a condensate collecting vessel 15 where it is collected for subsequent reuse inside (condensate line 17) or outside (condensate discharge line 16) the installation.

Furthermore, a suspension discharge line 18 having a suspension pump 30 is connected to the crystallizer 1 in the base region 2. The suspension discharge line 18 leads to a solid/liquid separating device 19 which can consist of a thickener which is formed as a hydrocyclone and has a centrifuge connected downstream.

The mother solution, or liquor, separated in the solid/liquid separating device 19 and having fine crystallizate contained therein can be introduced into a dissolving apparatus 24 through a mother solution discharge line 27, while the separated solid is supplied to a dryer 20 for drying. The dry crystallizate coming from the dryer 20 passes to a screen device 21, in which the contained proportion of fine crystallizate is separated from an ammonium sulphate product 22 with the desired coarse grain size spectrum. The separated fine fraction is conveyed via sub-grain discharge 23, just like the liquid phase, from the solid/liquid separating device 19 into the dissolving apparatus 24. Since condensate can also be introduced via the condensate line 17 into the dissolving apparatus 24 which is expediently equipped with an agitating apparatus, it is possible to achieve complete substantially dissolution of the supplied solid to produce a reusable solution. This solution can be supplied through a solution line 25, which is formed, e.g., as an overflow line, to a solution collecting vessel 26, which is likewise expediently provided with an agitator, and is guided back from this location by means of a delivery pump 28 through a solution line 29 into the crystallizer 1. Feeding of the guided-back solution can be effected, e.g., as illustrated, in the vicinity of the annular clarifying region 3 of the crystallizer 1. However, in a particularly expedient manner, a feed can also be, e.g., at the beginning of the line 7 of the external solution circuit, wherein heating can then be effected in the heat exchanger 9 before introduction into the crystallization chamber. In order to convey a complete dissolution of solid in the external circuit, some of the condensate can also be fed from the condensate collecting vessel 15 into the line 7 where required (not illustrated).

In the diagram of the installation illustrated by way of example, the recirculation of fine crystal suspension, as provided in accordance with the invention, into the internal suspension circuit is ensured by means of a pipeline which is designated by the reference numeral 31 and in the flow direction branches off downstream of the circulating pump 8 from the pipeline of the external solution circuit and a small piece issues above the upper end of the flow guide pipe 6 into the crystallizer 1. In order to regulate the flow volume, a valve 32 is installed into the fine crystal suspension recirculation 31. The guided-back fine crystal suspension is conveyed without a separate pump merely by means of circulating pump 8 of the external solution circuit 7.

Exemplified Embodiment

A suspension flow having a solid proportion of 14.9 t/h was taken continuously from the base region of a DTB crystallizer which was supplied continuously with saturated ammonium sulphate solution. The circulation power of the internal suspension circuit was 15000 m$^3$/h, the circulation power of the external solution circuit was 1500 m$^3$/h. A quantity of clarified solution was guided back each hour via a suspension recirculation from the clarifying zone of the crystallizer as a fine crystal suspension into the crystallizer above the liquid level of the internal suspension circuit, wherein the solids content in the guided-back quantity was 152 kg/h. The ammonium sulphate product crystallizate produced by separation from the suspension flow had a grain coarseness which was almost completely constant over time with a diameter of about 2.4 mm.

It is a significant advantage of the present invention that the fine crystal suspension is available for seeding the internal suspension circuit without any additional outlay, i.e., a specific unit or additional expenditure of energy for production thereof are not required. No product crystallizate whatsoever is required for the fine crystal suspension, which would The embodiments of the invention in which an exclusive property or privilege is claimed are defined as follows:

1. Method for continuous production of a coarse-grained ammonium sulphate product of a grain size in the range of approximately 2.0-3.0 mm by crystallization of an ammonium sulphate solution in a crystallization stage which is operated in accordance with a draft tube baffled (DTB) principle, said method comprising:
    constantly circulating a suspension of mother solution and ammonium sulphate crystals in an internal circuit while evaporating water from the solution;
    drawing off a clarified partial flow of solution from a clarifying zone in an upper region of the crystallization stage into an external circuit;
    heating the solution so as to dissolve the solids contained therein and then guiding the solution back as a clear solution into a lower region of the crystallization stage, and continuously drawing off vapours from a head of the crystallization stage;
    supplying new ammonium sulphate solution from outside and drawing off a suspension flow containing the coarse-grained ammonium sulphate product from the lower region of the crystallization stage; and
    drawing off as a further partial flow a fine crystal suspension flow from the clarifying zone and guiding the fine crystal suspension flow back into the internal circuit of the crystallization stage without any previous dissolution of the solid proportion contained therein.

2. Method as claimed in claim 1, including recirculating the fine crystal suspension flow in a continuous manner.

3. Method as claimed in claim 2, including recirculating the fine crystal suspension flow with a constant flow volume, said flow dependent upon the production output of the crystallization stage, per unit of time.

4. Method as claimed in claim 1 wherein the fine crystal suspension flow is branched off from the partial flow of the clarified solution of the external circuit prior to heating thereof.

5. Method as claimed in claim 1 wherein the flow volume of the fine crystal suspension flow is adjusted such that the solid proportion contained therein corresponds per unit of time to a quantity in the range of 0.2-0.3% of the quantity of product crystallizate in the suspension flow drawn off from the lower region of the crystallization stage.

6. Method as claimed in claim 5, wherein the solids quantity in the guided-back fine crystal suspension flow is in the range of 0.8-1.5% of the product crystallizate quantity.

7. Method as claimed in claim 1 wherein the fine crystal suspension flow in the close range of the liquid level of the crystallization stage is fed back into the internal suspension circuit.

8. Installation for continuous production of a coarse-grained ammonium sulphate product of a grain size in the range of approximately 2.0-3.0 mm by crystallization of an ammonium sulphate solution in a crystallization stage, said installation comprising:
    a crystallizer which operates in accordance with the draft tube baffled (DTB) principle and has an inner suspension circuit with a flow guide pipe and which has an external circuit line for clarified solution;
    a heat exchanger which is connected into the external circuit line and having a vapour discharge line which is disposed at a head of the crystallizer;
    a solution supply line for external supply of new ammonium sulphate solution and having a suspension discharge line which leads from a base region of the crystallizer; and
    a fine crystal suspension return line connected to a clarifying zone of the crystallizer issues into the region of the inner suspension circuit of the crystallizer.

9. Installation as claimed in claim 8, wherein the fine crystal suspension return line has a valve for adjusting flow volume.

10. Installation as claimed in claim 8, wherein the fine crystal suspension return line branches off from the external circuit line upstream of the heat exchanger downstream of a circulating pump.

11. Installation as claimed in claim 8, wherein the fine crystal suspension return line issues into the crystallizer in the region of the height level of the upper end of the flow guide pipe.

12. Installation as claimed in claim 9, wherein the fine crystal suspension return line branches off from the external circuit line upstream of the heat exchanger downstream of a circulating pump.

13. Installation as claimed in claim 12, wherein the fine crystal suspension return line issues into the crystallizer in the region of the height level of the upper end of the flow guide pipe.

14. Method as claimed in claim 6, wherein the solids quantity in the guided-back fine crystal suspension flow is approximately 1% of the product crystallizate quantity.

15. Method as claimed in claim 2, wherein the fine crystal suspension flow is branched off from the partial flow of the clarified solution of the external circuit prior to heating thereof.

16. Method as claimed in claim 3, wherein the fine crystal suspension flow is branched off from the partial flow of the clarified solution of the external circuit prior to heating thereof.

17. Method as claimed in claim 2, wherein the flow volume of the fine crystal suspension flow is adjusted such that the solid proportion contained therein corresponds per unit of time to a quantity in the range of 0.2-0.3% of the quantity of product crystallizate in the suspension flow drawn off from the lower region of the crystallization stage.

18. Method as claimed in claim 17, wherein the solids quantity in the guided-back fine crystal suspension flow is in the range of 0.8-1.5% of the product crystallizate quantity.

19. Method as claimed in claim 2, wherein the fine crystal suspension flow in the close range of the liquid level of the crystallization stage is fed back into the internal suspension circuit.

20. Method as claimed in claim 3, wherein the fine crystal suspension flow in the close range of the liquid level of the crystallization stage is fed back into the internal suspension circuit.

* * * * *